United States Patent [19]

Harrison

[11] Patent Number: 5,493,951
[45] Date of Patent: Feb. 27, 1996

[54] LUBRICATION AND SEAL RING ASSEMBLY FOR PUMP

[76] Inventor: Curtis W. Harrison, 7533 Kathy La., Fort Worth, Tex. 76126

[21] Appl. No.: 238,452

[22] Filed: May 5, 1994

[51] Int. Cl.⁶ .............................. F01B 31/10; B65D 53/00
[52] U.S. Cl. .................. 92/155; 277/188 A; 277/DIG. 6
[58] Field of Search ............... 92/155, 168; 277/235 R, 277/DIG. 6, 188 A, 124

[56] References Cited

U.S. PATENT DOCUMENTS

| | | | |
|---|---|---|---|
| 1,256,881 | 2/1918 | Deventer | 277/235 R |
| 1,298,117 | 3/1919 | Strock | 277/235 R |
| 1,747,998 | 2/1930 | Sliter | 277/235 R X |
| 1,998,892 | 4/1935 | Braden | 277/235 R |
| 2,020,844 | 11/1935 | Magos et al. | 277/235 R |
| 2,151,096 | 3/1939 | Freedlander | 277/235 R X |
| 2,281,195 | 4/1942 | Jacobs | 277/235 R |
| 2,553,750 | 5/1951 | Cole | 277/235 R X |
| 2,562,262 | 7/1951 | De Witt, Sr. | 277/235 R X |
| 3,330,217 | 7/1967 | Baur et al. | 92/168 X |
| 3,341,211 | 9/1967 | Houghton et al. | 277/235 R X |
| 3,361,432 | 1/1968 | Usher | 277/235 R X |
| 3,438,841 | 4/1969 | Zumeta et al. | 277/235 R X |
| 3,481,824 | 12/1969 | Poltorak | 277/235 R X |
| 3,849,032 | 11/1974 | Mulvey et al. | 92/156 X |
| 4,082,300 | 4/1978 | Harbeck et al. | 277/123 |
| 4,116,451 | 9/1978 | Nixon et al. | 277/235 R X |
| 4,162,078 | 7/1979 | Cox | 277/DIG. 6 X |
| 4,169,605 | 10/1979 | Nishimoto et al. | 277/188 A |
| 4,306,728 | 12/1981 | Huperz et al. | 277/DIG. 6 X |
| 4,602,791 | 7/1986 | Zollner | 277/188 A X |
| 4,758,135 | 7/1988 | Woodward et al. | 92/168 X |
| 5,346,037 | 9/1994 | Flaig et al. | 92/168 X |

Primary Examiner—John E. Ryznic
Attorney, Agent, or Firm—Robert A. Felsman; Mark D. Perdue

[57] ABSTRACT

A fluid end including a cylinder has a bore extending therethrough. A plunger is reciprocally disposed in the bore. A packing element is disposed in the bore to seal the annular space between the plunger and bore and includes a lubrication ring formed of metallic fibers and impregnated with a solid lubricant, a seal ring formed of a high-lubricity polymeric material, and means for positioning the lubrication and seal rings in the bore.

19 Claims, 4 Drawing Sheets

LUBRICATION AND SEAL RING ASSEMBLY FOR PUMP

BACKGROUND OF THE INVENTION

1. Field of the Invention

The present invention generally relates to high-pressure fluid pumps. More particularly, the present invention relates to the fluid-handling sections, or fluid ends, of such high-pressure pumps.

2. Background Information

High-pressure, reciprocating fluid pumps have been used for many years in a variety of applications including oilfield applications, waterblasting, and the like. Such pumps are employed to pressurize water or other incompressible fluids to pressures upward of 10,000 pounds per square inch (p.s.i.).

These pumps typically employ a plunger reciprocating in a bore of a cylinder to pressurize fluid. Because of the high pressure generated and the reciprocating nature of such pumps, the sealing assemblies and lubrication systems of the pumps are of considerable importance in pump performance. Typical seal or packing assemblies include several seal rings of elastomeric material, which are positioned in the bore by one or more spacer members. See, e.g. U.S. Pat. No. 5,263,987, Oct. 19, 1993 to Harrison, and U.S. Pat. No. 4,991,495, Feb. 12, 1991 to Losgel, Sr. et al. These seals rely in part on frictional engagement between the seal, the plunger, and the bore to establish a seal against fluid leakage around the plunger. Consequently, these seals must be lubricated to prevent excessive friction and the resulting heat buildup. Typical prior-art seal assemblies are lubricated with fluid oils forced into the bore of the fluid end through a lubricant passage. The fluid lubricants include castor oil, brake fluid, and waste lubricants such as used transmission fluid. These lubricants mix with and contaminate the water or other process fluid that is pressurized by the pump.

Increasing environmental regulation restricts the level of contamination of process fluids that is acceptable for a given application. Thus, in many applications, prior-art, forcefully lubricated seal or packing assemblies are impractical. However, most prior-art seal assemblies will not operate satisfactorily if the seals are not lubricated. The friction caused by an unlubricated seal assembly causes temperature increases in pump components and may cause the plunger to seize in the bore of the cylinder.

A need exists, therefore, for an improved fluid end including a seal assembly that does not require forced lubrication with a fluid lubricant, wherein the lubricant does notcontaminate the process fluid to environmentally unacceptable levels.

SUMMARY OF THE INVENTION

It is a general object of the present invention to provide a fluid end for use in high-pressure fluid pumps that does not require forced lubrication with fluid lubricating oils, which contaminate the process fluid to an environmentally unacceptable level.

This and other objects of the present invention are accomplished by providing a fluid end including a cylinder having a bore extending therethrough. A plunger is reciprocally disposed in the bore. A packing element is disposed in the bore to seal the annular space between the plunger and bore and includes a lubrication ring formed of metallic fibers and impregnated with a solid lubricant, a seal ring formed of a high-lubricity polymeric material, and means for positioning the lubrication and seal rings in the bore.

According to a preferred embodiment of the present invention, the high-lubricity polymer is polytetraflouroethylene filled with molybdenum disulfide and the solid lubricant is molybdenum disulfide and paraffin.

According to a preferred embodiment of the present invention, the seal ring is v-shaped in cross section and in sealing engagement between the bore and plunger. The positioning means is spaced radially away from the plunger to reduce friction between the packing assembly and the plunger. The positioning means may be a coil spring or an elastomeric or metallic spacer ring.

Other objects, features, and advantages of the present invention will become apparent with reference to the detailed description, which follows.

DESCRIPTION OF THE PREFERRED EMBODIMENT

Figure 1:
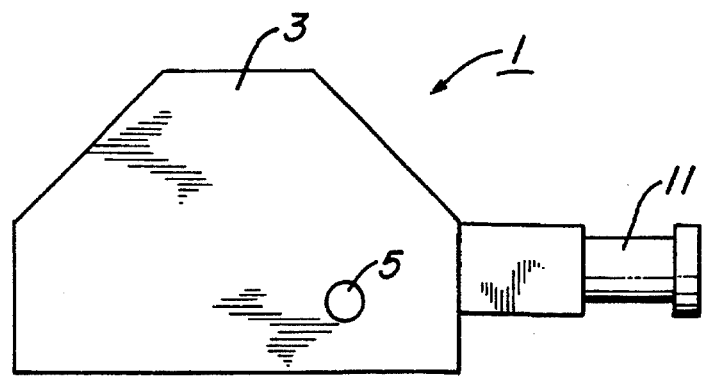
FIG. 1 illustrates an elevation view of a high-pressure fluid pump of the type contemplated by the present invention.

Referring now to the Figures, and specifically to FIG. 1, a high-pressure fluid pump 1 is illustrated. Pump 1 includes a power end 3, which houses a crank shaft 5 for connection to a prime mover, connecting rods, and associated equipment (not shown) for reciprocating a plunger (17 in FIGS. 2–4). Pump 1 includes a fluid-handling section or fluid end 11 for pressurizing water or another incompressible process fluid by reciprocation of the plunger in the cylinder of fluid end 11. Pump 1 is conventional in most respects, and can be a triplex (three cylinder) pump, a quintuplex (five cylinder) pump, or another conventional arrangement. Fluid end 11 is illustrated in greater detail in FIGS. 2–4, below.

Figure 2:
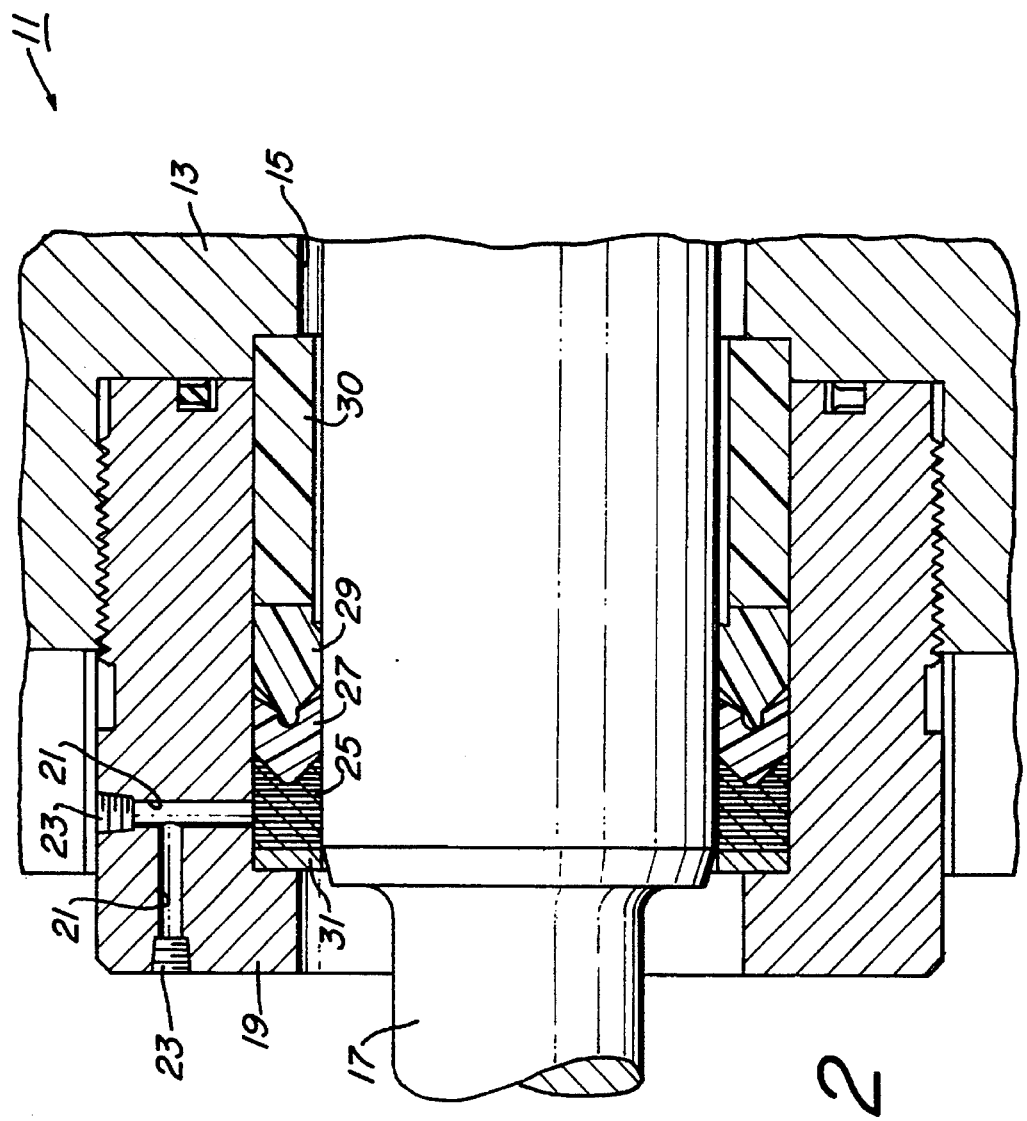
FIG. 2 is a fragmentary, longitudinal section view of one embodiment of a fluid end according to the present invention.

FIG. 2 is an enlarged, fragmentary longitudinal section view of a fluid end 11 according to the present invention. Fluid end 11 includes a cylinder 13, which has a longitudinal bore 15 formed therein. A plunger 17 is reciprocally disposed in bore 15 to pressurize the process fluid.

A packing assembly is disposed in an annular space between bore 15 and plunger 17 to seal against fluid leakage from bore 15. A gland nut 19 is threaded in cylinder 13 to retain the packing assembly in bore 15. Lubricant passages 21 are formed in gland nut 19 to deliver fluid lubricant to the packing assembly. Because the present invention eliminates the need for forced fluid lubrication of the packing assembly, lubricant passages 21 are closed with threaded plugs 23.

The packing assembly includes a lubrication ring 25, which is formed of metallic fibers and impregnated with a solid lubricant. According to a preferred embodiment of the present invention, lubrication ring 25 is formed of a knitted mesh of metallic wire, which is compacted around a mandrel to form near-solid but porous ring. Lubrication ring 25 is impregnated with a solid lubricant, preferably molybdenum disulfide dispersed in paraffin wax. The structure of lubrication ring 25 is described in greater detail with reference to FIG. 5, below.

Lubrication ring 25 is backed by a seal ring 27, which preferably is formed of a high-lubricity (low coefficient of friction) polymer, such as polytetraflouroethylene filled with solid lubricant such as molybdenum disulfide. Seal ring 27 preferably is v-shaped in cross-section to provide a chevron-type sealing element, which is energized or urged into sealing engagement between bore 15 and plunger 17 by fluid pressure acting on the legs of seal ring 25.

A resilient, elastomeric ring 29 and spacer ring cooperate to maintain seal ring 27 and lubrication ring 25 in mating engagement and to position them within bore 15. Spacer ring 30 is radially spaced away from plunger 17 to prevent frictional engagement therebetween and resulting unnecessary heat buildup. A metallic spacer washer 31 is disposed between gland nut 19 and lubrication ring 25 to prevent extrusion of lubrication ring 25.

Figure 3:
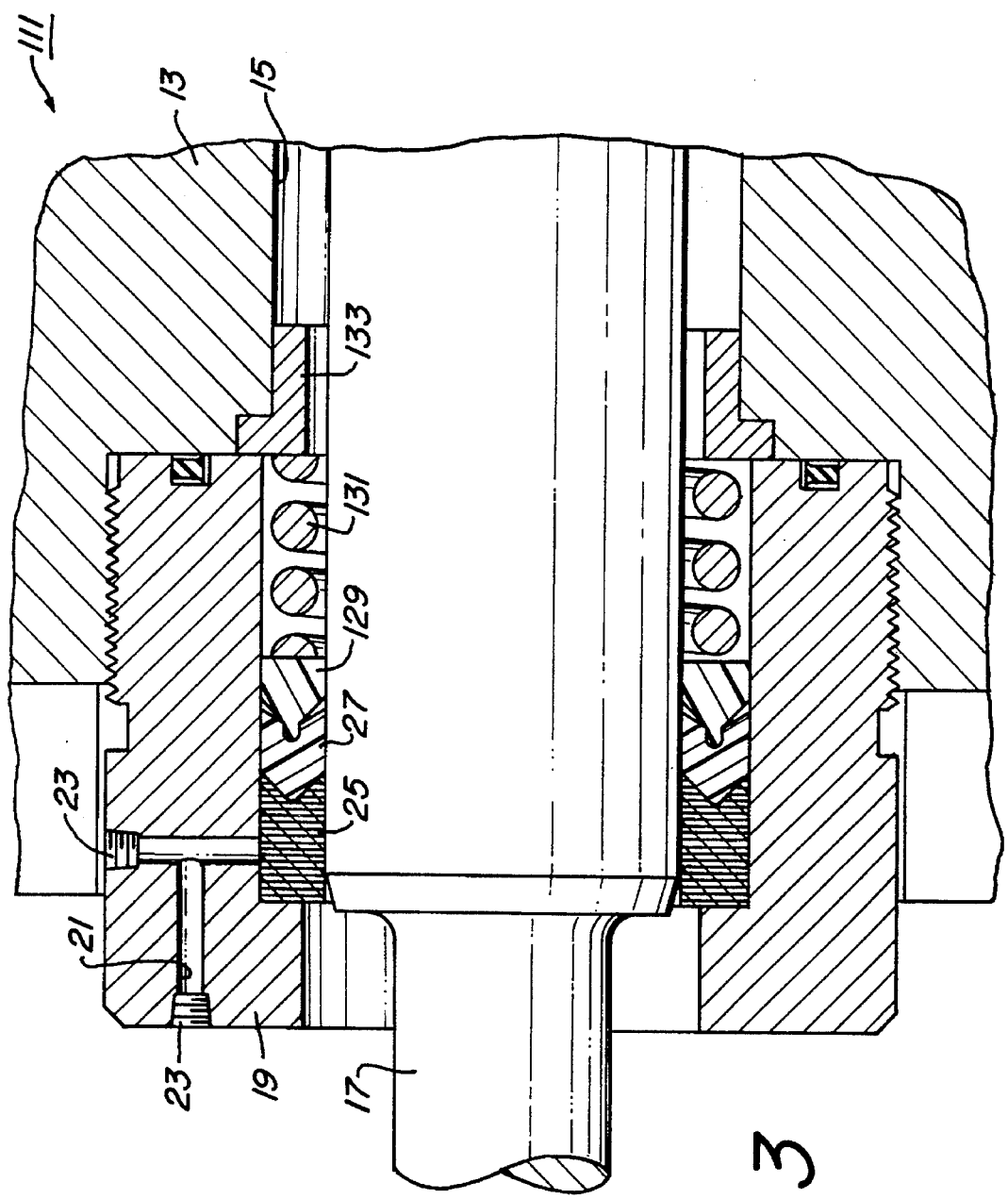
FIG. 3 is a fragmentary, longitudinal section view of one embodiment of a fluid end according to the present invention.

FIG. 3 is an enlarged, fragmentary longitudinal section view of a fluid end 111 according to the present invention, having a packing assembly slightly different from that of FIG. 2. Structure similar to that illustrated in FIG. 3 is similarly numbered. The packing assembly includes a lubrication ring 25 and a seal ring 27, which are identical in configuration to that illustrated in FIG. 2. A spring adapter 129 backs up seal ring 27 and mates with a positioning means 131 in the form of a coil spring. Coil spring 131 abuts a spring retainer 133 disposed in bore 15. Coil spring 131 and spring adapter 129 cooperate to position seal ring 27 and lubrication ring 25 in bore 15 and to maintain them in mating engagement. Coil spring 131 is spaced radially away from plunger 17 to prevent frictional engagement therebetween.

Figure 4:
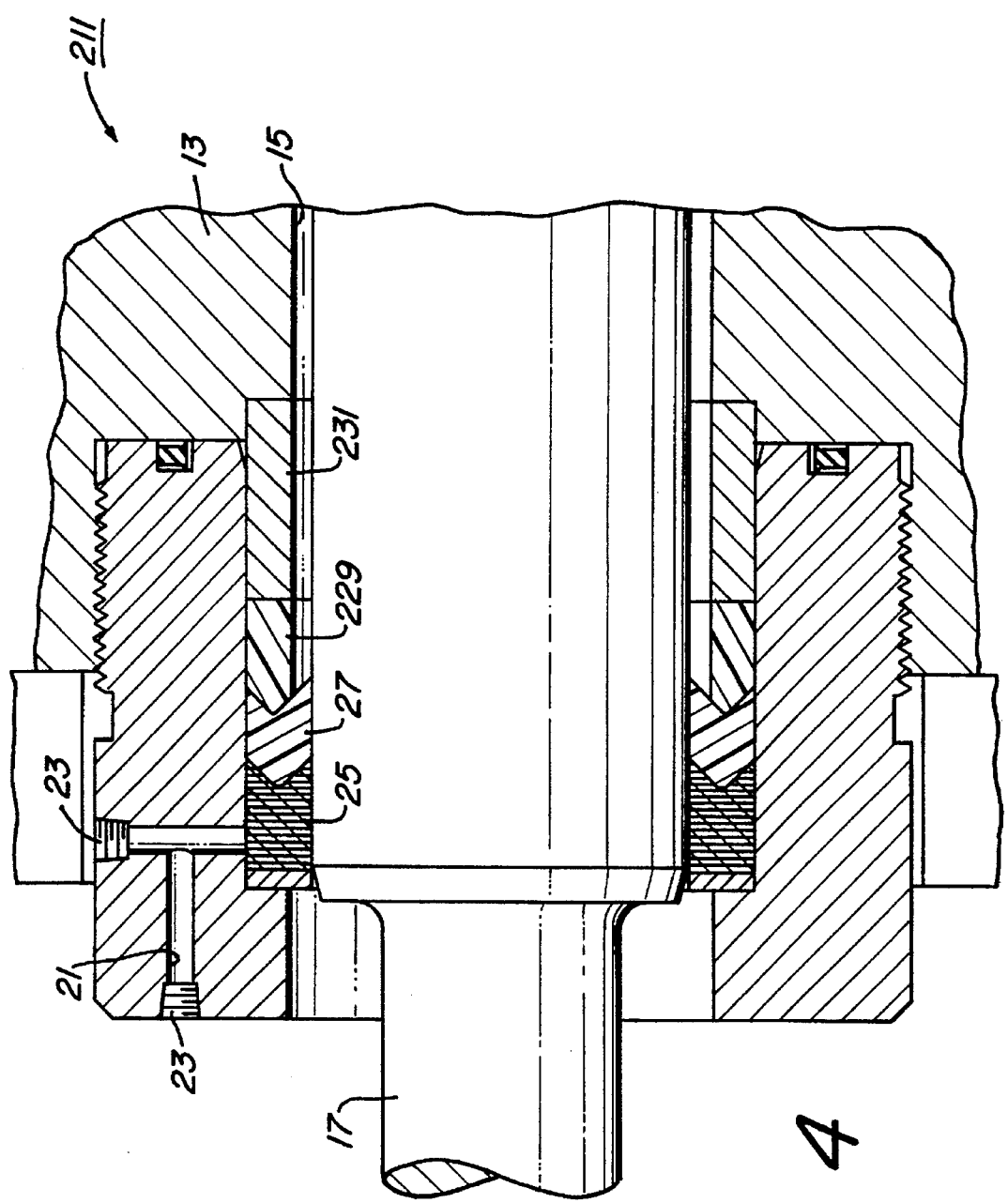
FIG. 4 is a fragmentary, longitudinal section view of one embodiment of a fluid end according to the present invention.

FIG. 4 is an enlarged, fragmentary longitudinal section view of a fluid end 211 having a packing assembly slightly different from those illustrated in FIGS. 2 and 3. Structure similar to that illustrated in FIGS. 2 and 3 is similarly numbered. The packing assembly includes a lubrication ring 25 and a seal ring 27 identical to those illustrated in FIGS. 2 and 3. An elastomeric, resilient ring 229 and a spacer ring 231, cooperate to position lubricant ring 25 and seal ring 27 in bore 15 and to maintain them in mating engagement. Elastomeric ring 229 and spacer ring 231 are spaced radially away from plunger 17 to avoid frictional engagement therebetween.

Figure 5:
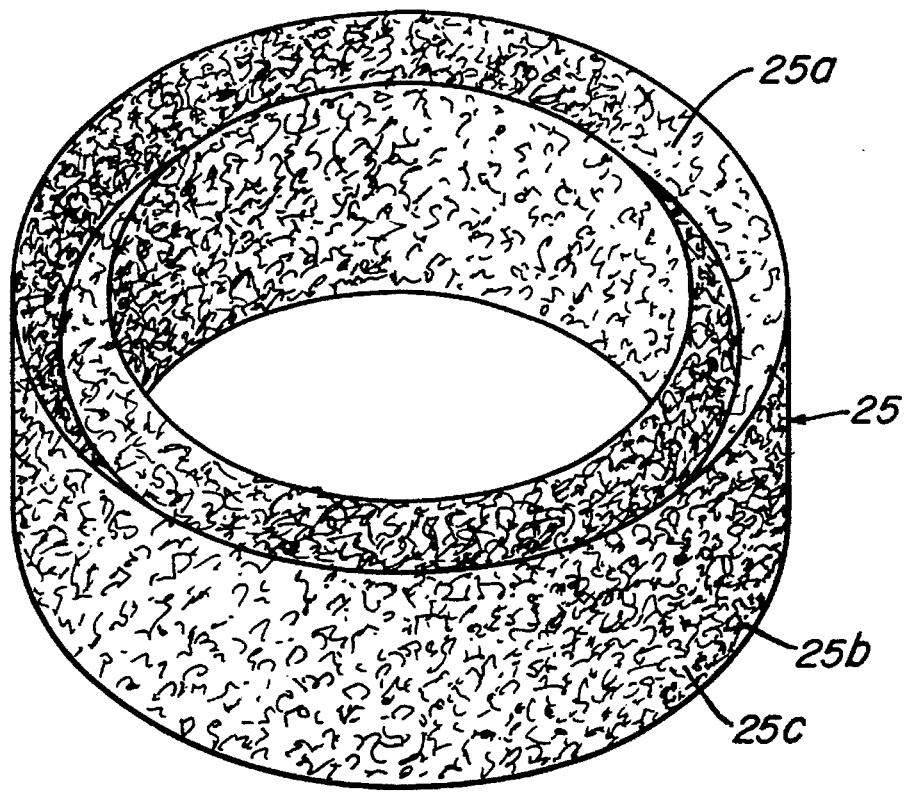
FIG. 5 is a perspective view of a lubrication ring for use in the improved fluid end according to the present invention.

FIG. 5 is a perspective view of lubrication ring 25 according to the present invention. As stated above, lubrication ring 25 is formed of knitted metallic fibers, which are compacted about a mandrel (not shown) to increase the density of ring 25 and to give it its annular configuration, and to provide a v-shaped depression 25a, which matingly engages with v-shaped seal ring 27. A preferred material for the metallic fibers or wires is aluminum-bronze, but other similar materials may be suitable. After compaction, strands of metallic fiber 25b are close together, yielding a near-solid ring 25. Porosities or interstices 25c are present between individual fibers 25b. Ring 25 thus is capable of being impregnated with, and retaining, a quantity of solid lubricant. A preferred solid lubricant is molybdenum disulfide dispersed in paraffin wax.

With reference to FIGS. 1–5, the operation of fluid end 11 according to the present invention will be described. Rotary power is provided to high-pressure fluid pump 1 through crank shaft 5 of power end 3. Rotation of crank shaft 5 causes plunger 17 to reciprocate in bore 15 of cylinder 13 of fluid end 11. The reciprocating action of plunger 17 in bore 15 compresses process fluid in a pressure chamber (not shown) at the terminal end of bore 15. The packing assembly disposed between plunger 17 and bore 15 seals the annular space therebetween against fluid leakage around plunger 17.

Specifically, seal ring 27 contacts the exterior surface of plunger 17 and the interior surface of bore 15 due to its v-shaped configuration. Pressurized fluid bearing against the legs of seal ring 27 urge them into enhanced sealing engagement with bore 15 and plunger 17. As plunger 17 reciprocates in bore friction builds and the temperature of the packing assembly becomes elevated. When the temperature is sufficiently high to melt the paraffin impregnated into lubrication ring 25, trace amounts of solid lubricant are released. The solid lubricant is sufficient to lubricate the high-lubricity seal ring 27 and prevent excessive temperature increase, which can lead to breakdown of the packing assembly and the possible seizure of plunger 17 within bore 15.

A principal advantage of the fluid end according to the present invention is that it does not require forced fluid lubrication, which can contaminate process fluid to environmentally unacceptable levels. This results in a fluid end for high-pressure fluid pumps that broadens the applications in which the pumps can be employed.

The present invention has been described with reference to preferred embodiments thereof. Those having skill in the art will appreciate that the invention is thus not limited, but is susceptible to variation and modification without departure from the scope and spirit thereof.

I claim:

1. An improved fluid end for use in high-pressure fluid pumps, the fluid end comprising:
    a cylinder;
    a bore extending through the cylinder;
    a plunger reciprocally disposed in the bore; and
    a packing element disposed in the bore to seal an annular space between the plunger and the bore, the packing element including:
        a lubrication ring formed of metallic fibers and impregnated with a solid lubricant;
        a seal ring formed of a high-lubricity polymeric material; and
        means for positioning the lubrication and seal rings in the bore.

2. The fluid end of claim 1 wherein the high-lubricity polymer is polytetrafluoroethylene.

3. The fluid end of claim 1 wherein the high-lubricity polymer is polytetrafluoroethylene filled with molybdenum disulfide.

4. The fluid end of claim 1 wherein the positioning means is a coil spring.

5. The fluid end of claim 1 wherein the positioning means is an elastomeric spacer.

6. The fluid end of claim 1 wherein the solid lubricant is molybdenum disulfide and paraffin.

7. The fluid end of claim 1 wherein the lubrication ring and seal ring are in contact with both the plunger and the bore.

8. The fluid end of claim 1 wherein the seal ring is v-shaped in cross-section.

9. An improved fluid end for use in high-pressure fluid pumps, the fluid end comprising:
    a cylinder;

a bore extending through the cylinder;

a plunger reciprocally disposed in the bore; and a packing element disposed in the bore to seal an annular space between the plunger and the bore, the packing element including:

a porous lubrication ring formed of metallic fibers and impregnated with a solid lubricant;

a seal ring formed of a high-lubricity polymeric material, the seal ring being v-shaped in cross section and in sealing engagement between the plunger and the bore; and means for positioning the lubrication and seal rings in the bore, the positioning means being spaced radially away from the plunger to reduce friction between the packing assembly and the plunger.

10. The fluid end of claim 9 wherein the high-lubricity polymer is polytetrafluoroethylene.

11. The fluid end of claim 9 wherein the high-lubricity polymer is polytetrafluoroethylene filled with molybdenum disulfide.

12. The fluid end of claim 9 wherein the positioning means is a coil spring.

13. The fluid end of claim 9 wherein the positioning means is an elastomeric spacer ring.

14. The fluid end of claim 9 wherein the solid lubricant is molybdenum disulfide and paraffin.

15. An improved fluid end for use in high-pressure fluid pumps, the fluid end comprising:

a cylinder;

a bore extending through the cylinder;

a plunger reciprocally disposed in the bore; and a packing element disposed in the bore to seal an annular space between the plunger and the bore, the packing element including:

a porous lubrication ring formed of metallic wire mesh and impregnated with a solid lubricant;

a seal ring formed of polytetrafluoroethylene, the seal ring being v-shaped in cross section and in sealing engagement between the plunger and the bore; and means for positioning the lubrication and seal rings in the bore, the positioning means being spaced radially away from the plunger to reduce friction between the packing assembly and the plunger.

16. The fluid end of claim 15 wherein the polytetrafluoroethylene is filled with molybdenum disulfide.

17. The fluid end of claim 15 wherein the solid lubricant is molybdenum disulfide and paraffin.

18. The fluid end of claim 15 wherein the positioning means is a coil spring.

19. The fluid end of claim 15 wherein the positioning means is an elastomeric spacer ring.

* * * * *